(12) United States Patent  
Patel et al.

(10) Patent No.: US 7,992,390 B2
(45) Date of Patent: Aug. 9, 2011

(54) EXTERNAL RIGID FUEL MANIFOLD

(75) Inventors: Bhawan B. Patel, Mississauga (CA); Oleg Morenko, Oakville (CA)

(73) Assignee: Pratt & Whitney Canada Corp., Longueil, Quebec (CA)

( * ) Notice: Subject to any disclaimer, the term of this patent is extended or adjusted under 35 U.S.C. 154(b) by 497 days.

(21) Appl. No.: 12/236,085

(22) Filed: Sep. 23, 2008

(65) Prior Publication Data
US 2010/0071663 A1 Mar. 25, 2010

(51) Int. Cl.
*F02C 1/00* (2006.01)
(52) U.S. Cl. ............................................ 60/734; 60/739
(58) Field of Classification Search .................. 60/734, 60/739, 740, 742, 746
See application file for complete search history.

(56) References Cited

U.S. PATENT DOCUMENTS

| | | | |
|---|---|---|---|
| 2,850,875 A * | 9/1958 | Gahwyler | 60/746 |
| 3,283,502 A | 11/1966 | Lefebvre | |
| 3,619,474 A | 11/1971 | Beck | |
| 3,719,042 A * | 3/1973 | Chamberlain | 60/739 |
| 3,777,983 A * | 12/1973 | Hibbins | 239/422 |
| 4,220,179 A | 9/1980 | Scheffler et al. | |
| 4,258,544 A | 3/1981 | Gebhart et al. | |
| 4,259,990 A | 4/1981 | Rohner | |
| 4,305,255 A | 12/1981 | Davies et al. | |
| 4,467,610 A | 8/1984 | Pearson et al. | |
| 4,735,044 A | 4/1988 | Richey et al. | |
| 4,742,685 A * | 5/1988 | Halvorsen et al. | 60/739 |
| 4,915,121 A | 4/1990 | Rains | |
| 5,031,407 A * | 7/1991 | Zaremba et al. | 60/739 |
| 5,127,441 A | 7/1992 | Rains | |
| 5,197,288 A | 3/1993 | Newland et al. | |
| 5,269,468 A | 12/1993 | Adiutori | |
| 5,390,498 A * | 2/1995 | Sulkin | 60/739 |
| 5,423,178 A | 6/1995 | Mains | |
| 5,570,580 A | 11/1996 | Mains | |
| 5,577,386 A | 11/1996 | Alary et al. | |
| 5,634,328 A | 6/1997 | Ansart et al. | |
| 5,782,579 A | 7/1998 | Dupouy et al. | |
| 5,803,127 A | 9/1998 | Rains | |
| 6,915,638 B2 | 7/2005 | Runkle et al. | |
| 7,234,492 B2 | 6/2007 | Bastard et al. | |
| 7,832,377 B2 * | 11/2010 | Lee et al. | 123/470 |
| 2007/0204621 A1 * | 9/2007 | Fish | 60/739 |

OTHER PUBLICATIONS

Office Action dated Aug. 6, 2010, issued by the Canadian Intellectual Property Office on Applicant's corresponding Canadian Patent Application 2,662,030.

* cited by examiner

*Primary Examiner* — Michael Cuff
*Assistant Examiner* — Phutthiwat Wongwian
(74) *Attorney, Agent, or Firm* — Norton Rose Or LLP

(57) ABSTRACT

A fuel manifold of a gas turbine engine includes a tube assembly having substantially rigid inner tubes disposed inside of substantially rigid outer tubes in pairs, concentrically spaced apart by a spacer apparatus. The inner tubes form a primary fuel passage for directing a primary fuel flow and the outer tubes form a secondary fuel passage for directing a secondary fuel flow, the secondary flow being greater than the primary flow.

16 Claims, 5 Drawing Sheets

EXTERNAL RIGID FUEL MANIFOLD

TECHNICAL FIELD

The application relates generally to a gas turbine engines and, more particularly a gas turbine engine having an improved fuel manifold for delivery of primary and secondary fuel flows to fuel nozzles.

BACKGROUND OF THE ART

A fuel manifold of a gas turbine engine distributes fuel from a fuel control system to fuel nozzles mounted on a support casing. Due to the high temperature environment, prior art manifolds of various types have disadvantages. For example, external flex tube manifolds are vulnerable to thermal distress, fuel leakage and fire hazard, and external transfer tube type manifolds which have a large number of parts suffer from problems of O-ring durability, fuel leakage, higher wetted-wall temperature and soak-back metal temperature which results in coke formation. In certain cases, a manifold is adapted to deliver a primary fuel flow which is in a small amount to starter fuel nozzles and a secondary fuel flow to the remaining fuel nozzles. There is always a challenge to provide a fuel passage configuration for the primary fuel flow in a small amount in such a high temperature environment.

Accordingly, there is a need to provide an improved fuel manifold for gas turbine engines.

SUMMARY

In one aspect, there is provided a gas turbine engine which comprises an external engine case; a fuel source; a combustor having an array of fuel nozzles including at least one starter nozzle, the at least one starter nozzle being less than half of the fuel nozzles of the array; and a manifold communicating between the fuel source and the fuel nozzle array, the manifold being mounted circumferentially around the external engine case and having a tube assembly including a plurality of metal inner and outer tube pairs, an inner tube being disposed inside an outer tube and concentrically spaced apart from the outer tube by a spacer apparatus between the inner and outer tubes, the inner tube being rigid and in fluid communication with said at least one starter fuel nozzle for directing a primary fuel flow to said at least one starter fuel nozzle, the outer tube being rigid and in fluid communication with a remainder of the fuel nozzles of the array of fuel nozzles for directing a secondary fuel flow to said remainder of the fuel nozzles, the secondary fuel flow being greater than the primary fuel flow In another aspect there is provided a gas turbine engine having a manifold which comprises a tube assembly of a plurality of hardwall inner and outer tube pairs, an inner tube being and disposed inside an outer tube in each pair and being concentrically spaced apart from the outer tube by a spacer apparatus radially between the tubes, the plurality of pairs of tubes extending between and being connected by a plurality of base connectors, the base connectors mounted to an external side of a casing of the engine, the tube assembly communicating an array of fuel nozzles via the base connectors, the length of the tube assembly between base connectors being greater than the absolute distance between base connectors such that the tube assembly is non-linear between adjacent base connectors, the inner tubes forming a first fuel passage for directing a primary fuel flow from a fuel source to at least one fuel nozzle of the array, the at least one fuel nozzle being less than half of the fuel nozzles of the array, the outer tubes forming a second fuel passage for directing a secondary fuel flow from the fuel source to the remaining fuel nozzles of the array, the secondary flow being larger than the primary flow.

Further details of these and other aspects of the present invention will be apparent from the detailed description and drawings included below.

DESCRIPTION OF THE DRAWINGS

Reference is now made to the accompanying figures, in which.

DETAILED DESCRIPTION

Figure 1:
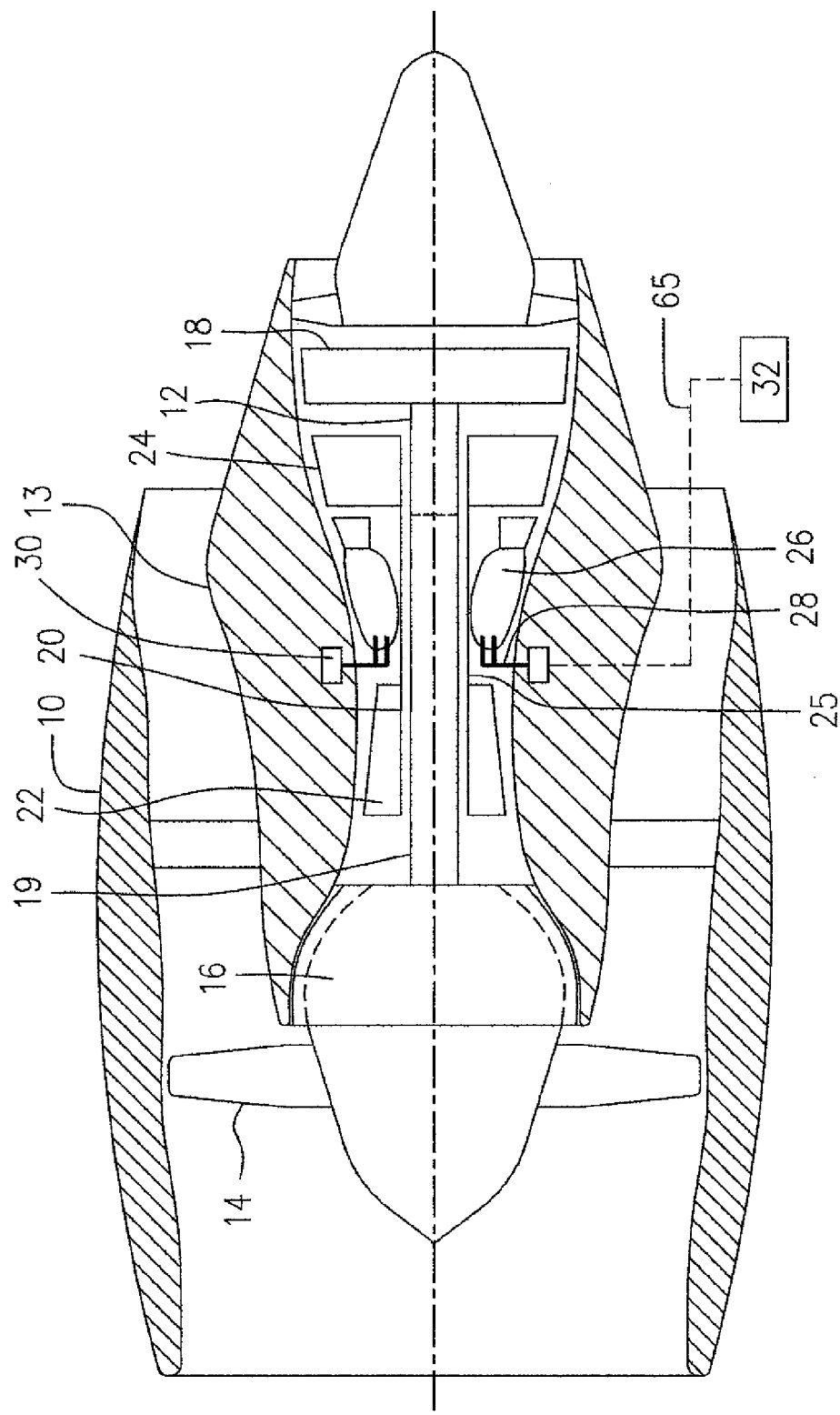
FIG. 1 is a schematic cross-sectional view of an exemplary turbofan gas turbine engine, showing an application of the described technique.

A typical application of the technique to be described is schematically illustrated in FIG. 1. A turbofan engine includes a housing or nacelle 10, a low pressure spool assembly seen generally at 12 which includes a fan 14, low pressure compressor 16 and low pressure turbine 18 connected by shaft 19 and a high pressure spool assembly seen generally at 20 which includes a high pressure compressor 22 and high pressure turbine 24 connected by shaft 25. Within a core casing or external casing 13 there is provided an annular combustor 26 where hot combustion gases are produced to power the turbines 24 and 18. An engine fuel system including for example, an array of fuel nozzles 28 and a fuel manifold 30, is provided for distributing fuel from a fuel source 32 through a fuel line 65 into the combustor 26 to be ignited for combustion.

One of the problems inherent in the operation of a gas turbine engine is the effect of the high temperatures that are developed in the region of combustion. These high temperatures put a tremendous thermal strain on engine components. More importantly, safety hazards caused by high temperatures must be fully considered by engine designers. Fuel leakage considerations and fuel coking formation become important in the area surrounding the combustor 26. Therefore, the fuel system must be operated in a safe and reliable manner. In a typical gas turbine engine, the temperature around the annular combustor 26 is over 800° F.

Figure 3:
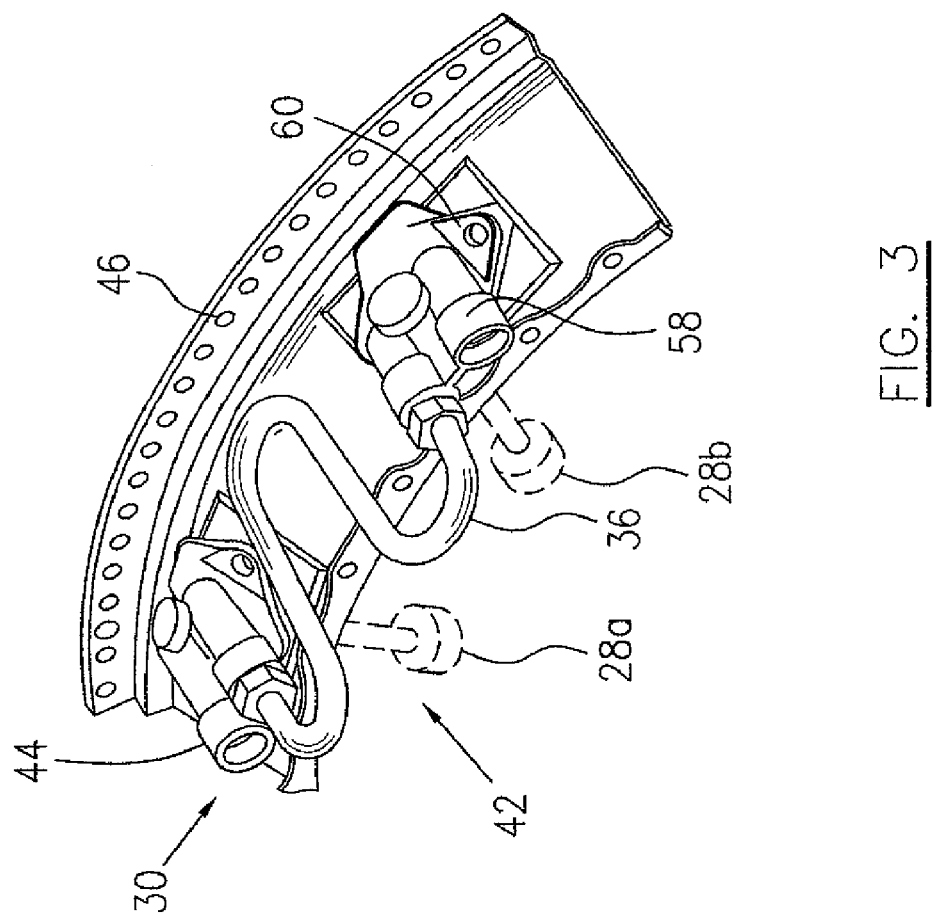
FIG. 3 is a partial perspective view of a segment of the manifold of FIG. 2, mounted to a stationary structure of the engine.
Figure 2:
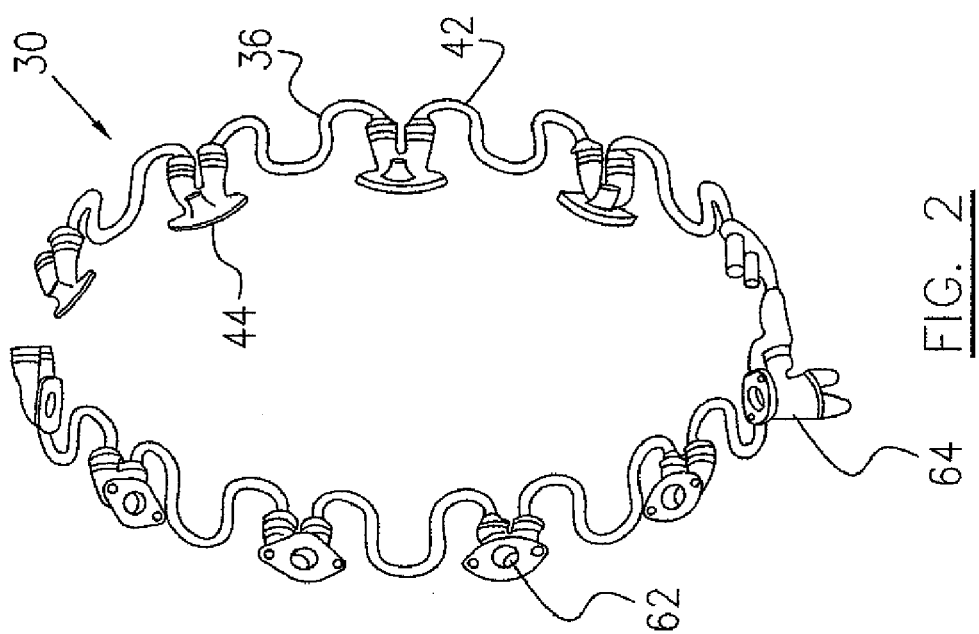
FIG. 2 is a perspective view of a fuel manifold in accordance with one embodiment of this technique.

Referring now to FIGS. 1-5, the fuel manifold 30 according to one embodiment communicates between the fuel source 32 and fuel nozzle array (only two shown in FIGS. 1 and 3). The manifold 30 includes a generally circularly-arranged tube assembly, having a plurality of inner and outer tube pairs mounted circumferentially around the external engine casing 13. One inner tube 34 is inside one outer tube 36 in each pair. The inner and outer tubes 34, 36 are of each pair are concentrically spaced apart one from another by a plurality of spacers, for example wire spacers 38. Each pair of concentrically spaced inner and outer tubes 34, 36 has two joint assemblies 40 to thereby form a detachable segment 42 of the fuel manifold 30. The segments 42 of the manifold 30 are connected by a plurality of base connectors 44 which are mounted to a stationary structure such as an annular casing 46 for supporting the fuel manifold 30 and for connection with the fuel nozzles 28.

Figure 4:
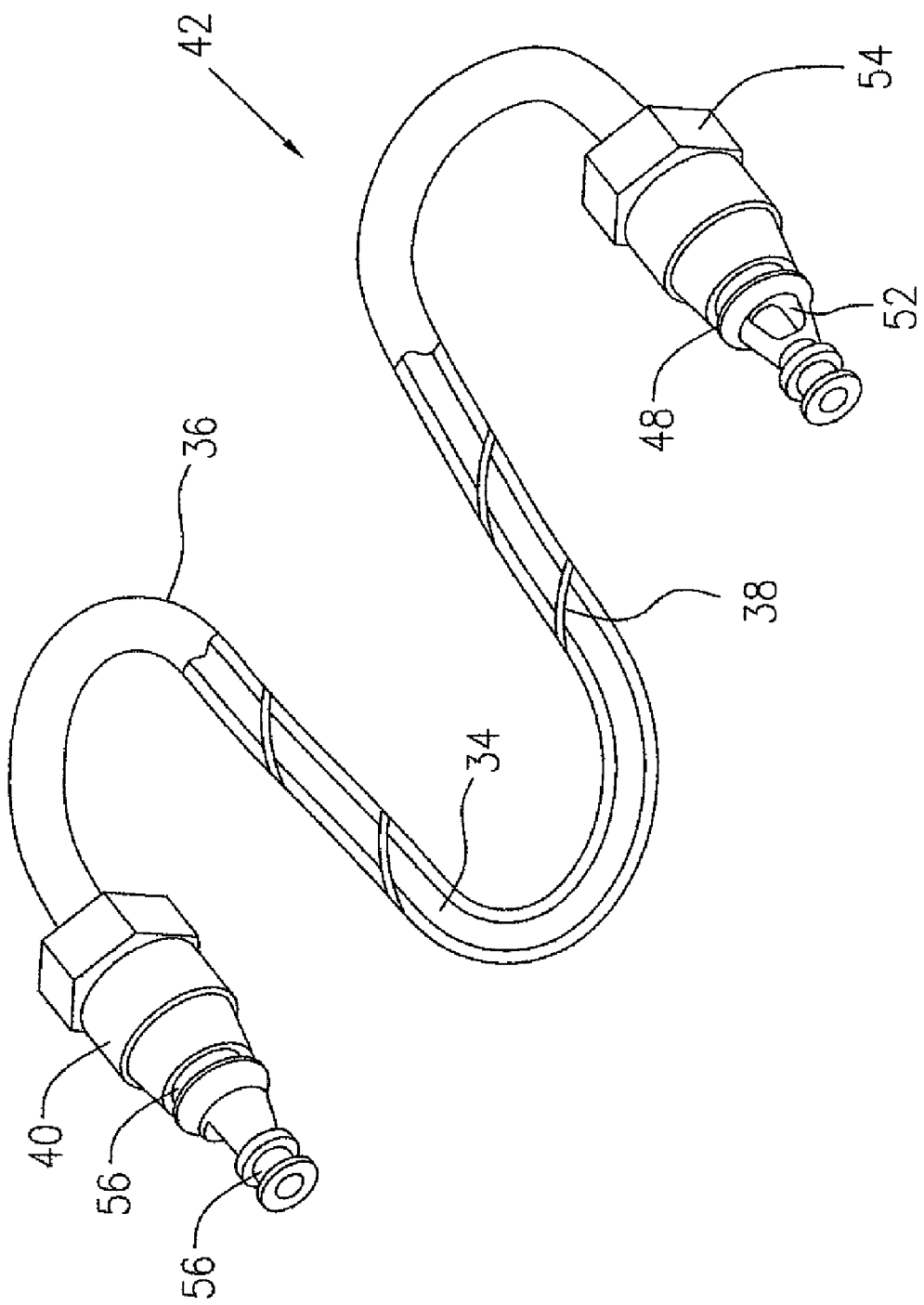
FIG. 4 is a perspective view of a pair of concentric inner and outer tubes which forms a segment of the manifold of FIG. 2, with a portion of the outer tube cut away to show wire spacers between the concentric inner and outer tubes.
Figure 5:
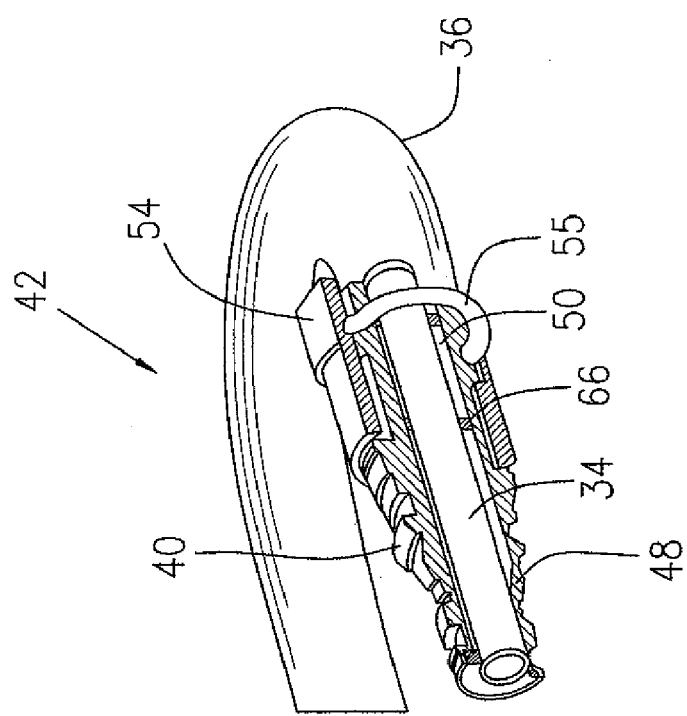
FIG. 5 is a partial perspective view of a pair of concentric inner and outer tubes of the manifold of FIG. 2, with a portion of a connector assembly cut away to shown an end joint of the inner and outer tubes.

The joint assembly 40 at each of the opposed ends of each pair of concentrically spaced inner and outer tubes 34, 36 as more clearly illustrated in FIGS. 4 and 5, includes a ferrule 48 which has a tubular configuration with a relatively smaller front end (not indicated) and a relatively large rear end (not indicated). One of the inner tubes 34 is inserted through an opening in the rear end of the ferrule 48, into an inner passage defined by the tubular configuration of the ferrule 48, to an opening defined in the front end of the ferrule 48. The inner tube 34 is affixed to the front end of the ferrule 48, for example, by a brazed joint 49 seamlessly filled in between the inner tube 34 and the inner passage near the front end of the ferrule 48.

One end of the outer tube 36 is connected to the relatively larger rear end of the ferrule 48 for example, by a welded or brazed joint such that an annulus 50 defined between the inner tube 34 and the ferrule 48 is in fluid communication with the annular space defined between the inner tube 34 and the outer tube 36 of each segment 42 of the fuel manifold 30. The opening in the front end of the ferrule 48 provides a fluid connection access to a first fuel passage defined by the inner tube 34 while an opening 52 defined in a side wall of the ferrule 48 provides a fluid connection access to a second fuel passage defined by the annulus 50 between the inner tube 34 and ferrule 48 and the annulus between the inner tube 34 and the outer tube 36.

The joint assembly 40 further includes a super-B nut 54 detachably affixed to the rear end of ferrule 48. The super-B nut 54 is attached to the ferrule with the help of a metal wire 55 to provide restraint in axial relative movement while freedom in a circumferential direction between the super-B nut 54 and the ferrule 48. Thus the super-B 54 nut provides axial pre-load for tight sealing on taper surfaces when assembled with the mating part of the ferrule 48.

Ferrule 48 may be provided with one or more circumferential grooves 56 defined around a front section thereof to receive seals therein to prevent fuel leakage when the front section of ferrule 48 is connected to the base connector 44.

The base connector 44 which connects adjacent segments 42, includes a pair of sockets 58 affixed to a mounting plate 60 which includes mounting holes (not indicated) for receiving fasteners (not shown) to secure the base connector 44 to the annular casing 46. Each of the paired sockets 58 is adapted to receive the front section of ferrule 48 in a sealed manner. The base connector 44 defines first and second internal passages (not shown) separate one from another. The first and second internal passages are in fluid communication with the paired sockets 58 such that when ferrules 48 of adjacent segments 42 of the manifold 30 are inserted into the respective paired sockets 58, the first inner passage in the base connector 44 is in fluid communication with the first fuel passage defined by the inner tubes 34 of the adjacent manifold segments 42, through the openings defined in the front ends of the respective ferrules 48 and the second internal passage defined in the base connector 44 is in fluid communication with the second passage defined in annulus 50 between inner tubes 34 and outer tubes 36 of the adjacent manifold segments 42 through the openings 52 defined in side walls of the ferrules 48. The base connector 44 further defines an opening 62 (see FIG. 2) for connection with a nozzle 28. The base connectors 44 include two types. In one type of base connector (referred to hereinafter as "type A") the opening 62 is in fluid communication with the internal first passage in the base connector 44 and in the other type of base connector (referred to hereinafter as "type B") the opening 62 is in fluid communication with the second internal passage in the base connector 44. Therefore, a fuel nozzle such as a starter fuel nozzle, indicated by numeral 28a, which is connected to a base connector 44 of type A, is in fluid communication with the first passage defined by the inner tubes 34 of the fuel manifold 30. A fuel nozzle used for supplying fuel in continuous combustion, indicated by 28b, which is connected to a base connector 44 of type B, is in fluid communication with the second passage defined between the inner tubes 34 and the outer tubes 36 of the fuel manifold 30.

One of the base connectors 44 (either type A or type B) includes an additional socket 64 (see FIG. 2) for connection with the fuel line 65 leading to the fuel source 32 (see FIG. 1).

Figure 7:
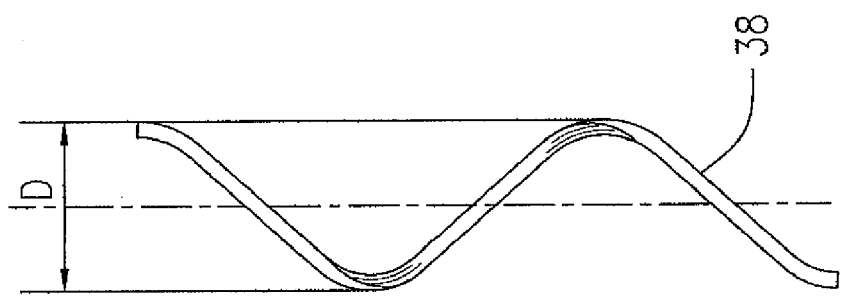
FIG. 7 is a perspective view of a wire spacer used in one embodiment.

In each of manifold segments 42, the pair of concentrically spaced inner and outer tubes 34, 36 is substantially rigid (i.e. hard wall tubes, as opposed to flexible hoses or the like, as are sometimes employed in external fuel manifolds) and are longer than the distance between adjacent base connectors and thus are bent (i.e. non-linear) in this example to form a smoothly curving line configuration. In this embodiment the smoothly curving line configuration of each pair of tubes 34, 36 is in a substantial W-shape for reducing thermal stress. This shape adds some resiliency to the segment 42 to allow the circumferential length of the segment to be expanded or contracted, despite the fact that the tubes 34, 36 are otherwise rigid—i.e. it is understood that the tubes are substantially rigid, but that the configuration in which they are provided allows the assembly to be somewhat flexible, which may facilitate installation. At least one spacer 38 is required between each paired inner and outer tubes 34,36. However two or more spacers may be desirable. The wire spacers 38 between the inner and outer tubes 34, 36 may be positioned in appropriate locations away from the joint connectors 40 at the opposed ends of the paired inner and outer tubes 34, 36 in order to enhance the rigidity of both inner and outer tubes 34, 36. Additionally, spacers of suitable types (two star spacers 66 are shown in FIG. 5) may also be used within the joint connectors 40 between the ferrule 48 (or outer tube 36) and the inner tube 34. In the embodiment of FIGS. 4 and 7, the wire spacer 38 is a piece of wire configured in a helical shape, the helix configuration having an outer diameter D slightly smaller than the inner diameter of the outer tube 36. The diameter of the piece of wire is smaller than half of the difference between the inner diameter of the outer tube 36 and the outer diameter of the inner tube 34. The helical configuration of the wire spacer 38 is simple in structure and does not result in significant pressure loss of the secondary fuel flow through the space between the inner and outer tubes 34, 36. The material of the wire spacer 38 is softer than the material of the outer tube 36 and thus fretting wear of the spacer rather than undesirable wear of the outer tube wall may occur. In such a smoothly curving line configuration, particularly in the W-shaped configuration, the spacers 38 help to position and support the inner tube 34. Sand may be used to fill in the tubes during a bending process in order to avoid cracking the tubes during the bending process.

Figure 8:
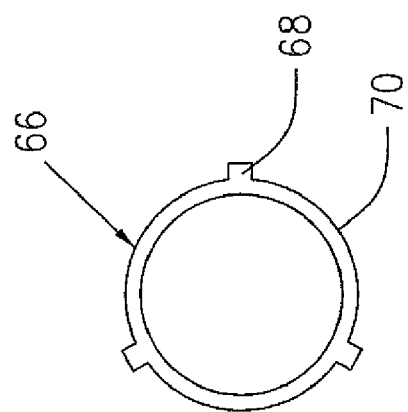
FIG. 8 is a top plane view of a star spacer used in another embodiment.
Figure 6:
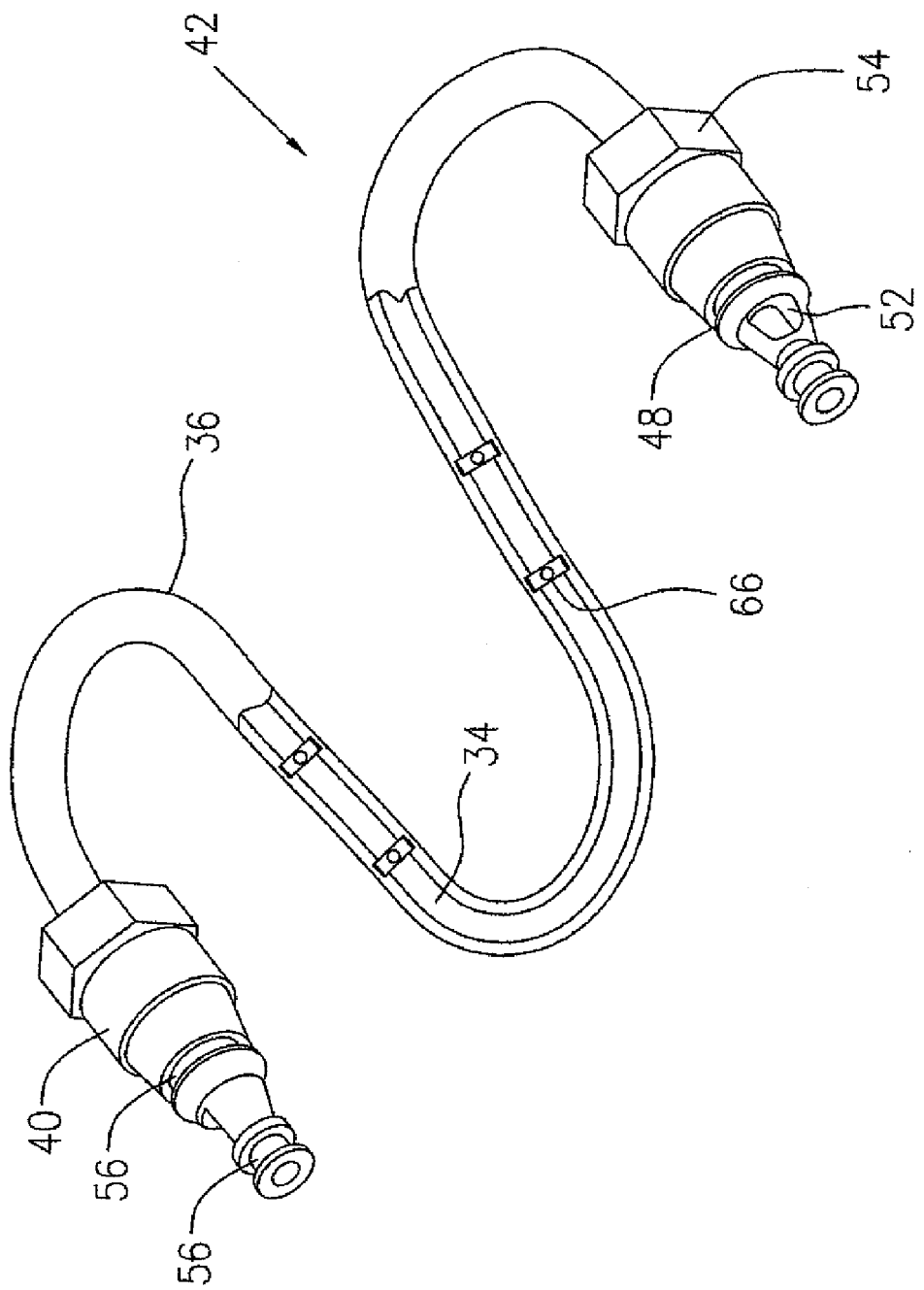
FIG. 6 is a perspective view of a pair of concentric inner and outer tubes, similar to those of FIG. 4, with a portion of the outer tube cut away to show star spacers between the inner and outer tubes according to another embodiment.

Wire spacers 38 may be replaced alternatively by any other suitable types of spacers, for example, star spacers 66 as shown in FIGS. 6 and 8. The star spacer 66 includes a plurality of circumferential spaced and radially projecting elements 68 (three elements shown in this embodiment) supported by a ring 70. In the embodiment of FIGS. 6 and 8, spacers 66 are positioned and attached around the inner tubes 34 in a manner similar to that of wire spacers 38.

The fuel manifold 30 includes at least one or more base connectors 44 of type A to connect with at least one or more starter nozzles 28a. The remaining base connectors 44 of the fuel manifold 30 are of type B to allow connection to fuel nozzles 28b for supplying fuel during continuous combustion. Therefore, the inner tubes 34 of the fuel manifold 30 provide a primary fuel flow passage to direct a primary fuel flow to the starter nozzle 28a or starter nozzles 28a and the outer tubes 36 in combination with the concentric inner tubes 34 provide a secondary fuel flow passage therebetween, to direct a secondary fuel flow to the remaining nozzles 28b for continuous combustion.

The volume of the primary fuel flow for the starter nozzle(s) is smaller than the volume of secondary fuel flow because the number of starter nozzles 28a is less than the number of fuel nozzles 28b (i.e less than half of the fuel nozzles 28 of the array). Therefore a relatively small diameter and the thin walled construction of the inner tubes 34 are desirable to reduce the fuel manifold fill up time. Such small diameter and thin walled tubes would be prone to damage during the engine assembly procedure, however, the inner tubes 34 for the primary fuel flow passage in fuel manifold 30, are protected by the presence of the concentric outer tubes 36 and are stiffened by the spacers (which significantly reduce the risk of damage during handling). The secondary fuel flow which is in a greater volume than the volume of the primary fuel flow, fills the secondary passage defined between the outer wall of the inner tube 34 and the inner wall of the outer tube 36, and maintains a lower wetted-wall temperature of the inner tube 34 which prevents coke formation in the inner tubes. It should also be noted that the small diameter and thin walled inner tubes 34 will not be as adversely affected by dynamic issues such as vibration because of the support provided by the spacers and outer tubes.

The segmented configuration of fuel manifold 30 is convenient for assembly and disassembly. The smoothly curving line configuration, particularly the W-shaped segments 42 of fuel manifold 30, compensates for thermal expansion between the base connectors mounted on the annular casing 46. The space between inner and outer tubes 34, 36 and the smoothly curving line configuration further help to reduce stresses due to differential expansion between inner and outer tubes. The W-shaped segments of the fuel manifold 30 also provide a deformability thereof which is desirable for convenience of assembly and disassembly.

The above description is meant to be exemplary only, and one skilled in the art will recognize that changes may be made to the embodiments described without departing from the scope of the technique disclosed. For example, the fuel manifold of the described embodiment can be used in any suitable types of gas turbine engines other than the described turbofan gas turbine engine which is taken as an example of the application of the described technique. Still other modifications which fall within the scope of the described technique will be apparent to those skilled in the art, in light of a review of this disclosure, and such modifications are intended to fall within the appended claims.

What is claimed is:

1. A gas turbine engine comprising
an external engine case;
a fuel source;
a combustor having an array of fuel nozzles including at least one starter nozzle, the at least one starter nozzle being less than half of the fuel nozzles of the array of fuel nozzles; and
a manifold communicating between the fuel source and the array of fuel nozzles, the manifold being mounted circumferentially around an external side of the external engine case and the manifold having a tube assembly including a plurality of metal inner and outer tube pairs, an inner tube being disposed inside an outer tube and concentrically spaced apart from the outer tube by a spacer apparatus between the inner and outer tubes, the inner tube being rigid and in fluid communication with said at least one starter fuel nozzle for directing a primary fuel flow to said at least one starter fuel nozzle, the outer tube being rigid and in fluid communication with a remainder of the fuel nozzles of the array of fuel nozzles for directing a secondary fuel flow to said remainder of the fuel nozzles, the secondary fuel flow being greater than the primary fuel flow.

2. The gas turbine engine as defined in claim 1 wherein the manifold comprises a plurality of base connectors mounted to a stationary structure for supporting the manifold and for connection with the array of fuel nozzles and wherein one of said inner and outer tube pairs extends between adjacent base connectors.

3. The gas turbine engine as defined in claim 2 wherein each of inner and outer tube pairs includes two ferrules, one at each of opposed ends of the tube pair, the ferrules being detachably connected to the respective base connectors.

4. The gas turbine engine as defined in claim 1 wherein the spacer apparatus is metal and composed of a metal softer than the outer tube metal.

5. The gas turbine engine as defined in claim 2 wherein each tube pair extends along a W-shaped path between adjacent base connectors.

6. The gas turbine engine as defined in claim 1 wherein the spacer apparatus comprises at least two of the spacers located between the inner and outer tubes and spaced away from each other and from the ferrules, thereby enhancing the rigidity of the tube assembly, the spacers configured to allow the secondary flow to pass therethrough.

7. The gas turbine engine as defined in claim 6 wherein the spacer apparatus further comprises a spacer in each ferrule, between the inner tube and the ferrule.

8. The gas turbine engine as defined in claim 1 wherein the spacer apparatus comprises at least one section of wire extending around the inner tube in a helical shape so as to thereby allow the secondary flow.

9. The gas turbine engine as defined in claim 1 wherein the spacer apparatus comprises at least one star spacer having a plurality of circumferentially spaced radially-extending elements supported by a ring extending around the inner tube, the spacer thereby configured so as to allow the secondary flow.

10. A gas turbine engine having a manifold comprising a tube assembly of a plurality of hardwall inner and outer tube pairs, an inner tube being and disposed inside an outer tube in each pair and being concentrically spaced apart from the outer tube by a spacer apparatus radially between the tubes, the plurality of pairs of tubes extending between and being connected by a plurality of base connectors, the base connectors circumferentially mounted to an external side of a casing of the gas turbine engine, the tube assembly communicating with an array of fuel nozzles via the base connectors, the length of the tube assembly between base connectors being greater than the absolute distance between base connectors such that the tube assembly is non-linear between adjacent base connectors, the inner tubes forming a first fuel passage for directing a primary fuel flow from a fuel source to at least one fuel nozzle of the array of fuel nozzles, the at least one fuel nozzle being less than half of the fuel nozzles of the array, the outer tubes forming a second fuel passage for directing a secondary fuel flow from the fuel source to the remaining fuel nozzles of the array, the secondary flow being larger than the primary flow.

11. The gas turbine engine as defined in claim 10 wherein each pair of concentrically spaced inner and outer tubes comprises two ferrules at opposed ends of the pair of tubes, the ferrules being detachably connected to the respective base connectors.

12. The gas turbine engine as defined in claim 11 wherein each pair of concentrically spaced inner and outer tubes is substantially rigid and connected between two circumferentially adjacent base connectors to form a smoothly curving line configuration.

13. The gas turbine engine as defined in claim 12 wherein the at least one spacer is located between the inner and outer tubes in each pair of tubes and spaced away from the ferrules at the opposed ends, for supporting the inner tube.

14. The gas turbine engine as defined in claim 12 wherein the smoothly curving line configuration of each pair of tubes comprises a substantial W-shape.

15. The gas turbine engine as defined in claim 10 wherein the at least one spacer between inner and outer tubes of each pair comprises a section of wire in a helical shape.

16. The gas turbine engine as defined in claim 10 wherein the at least one spacer between inner and outer tubes of each pair comprises a star spacer having a plurality of circumferentially spaced radial elements supported by a ring.

* * * * *